(No Model.) 7 Sheets—Sheet 5.
J. F. GOLDING.
MACHINE FOR MAKING SLASHED METALLIC SCREENING.
No. 381,231. Patented Apr. 17, 1888.
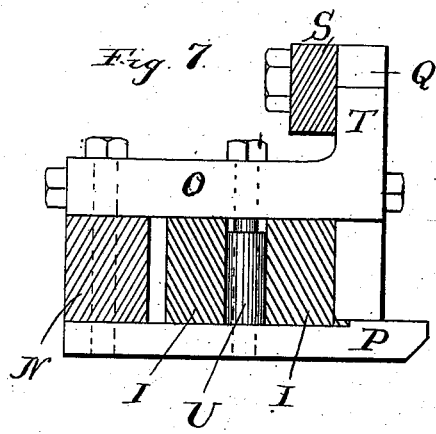
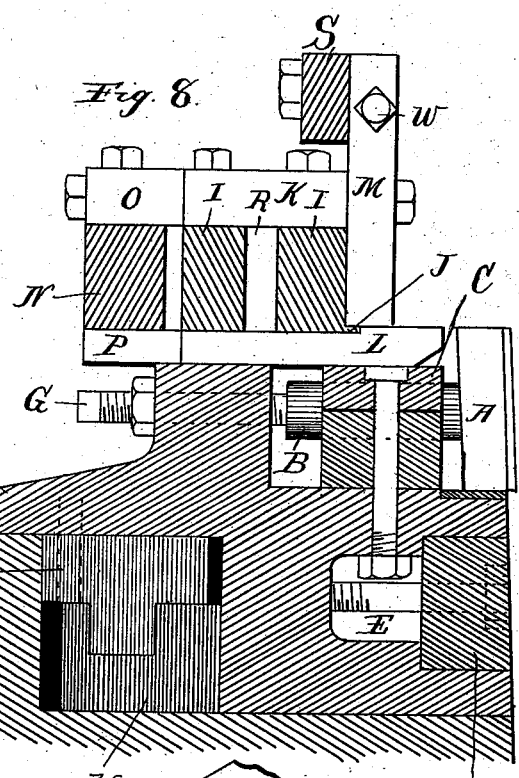
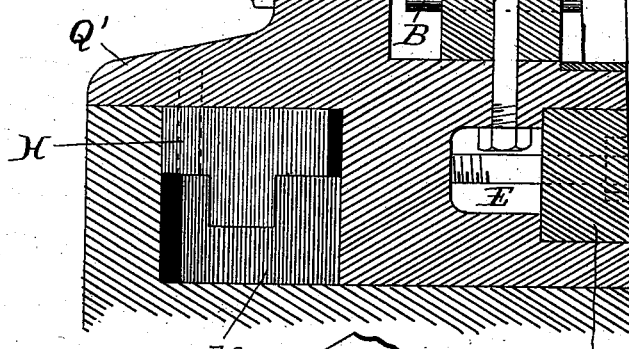
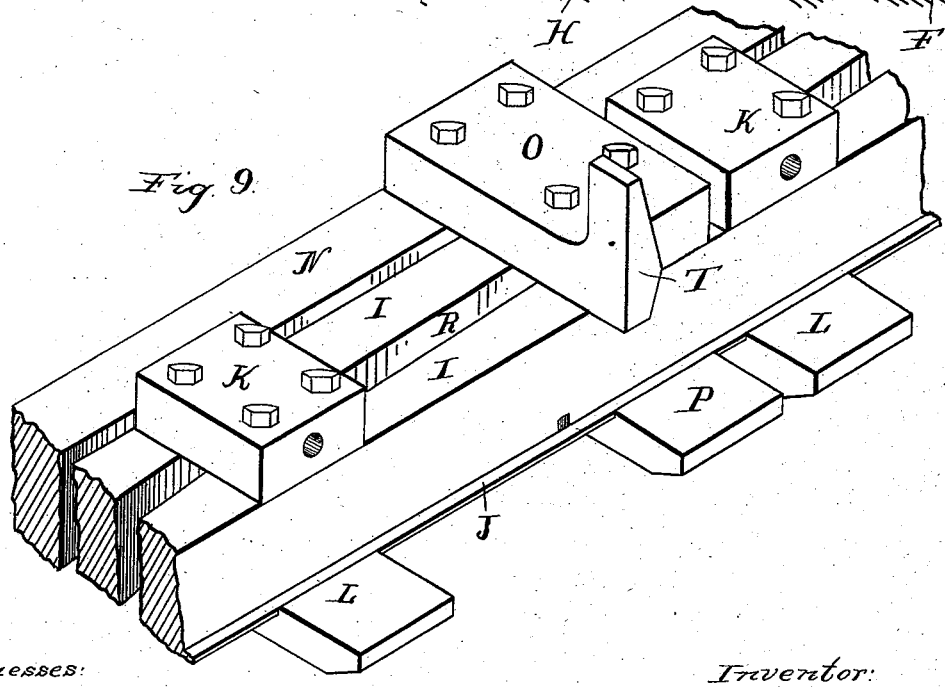
Witnesses:
Lew. E. Curtis.
Melvin M. Cohen
Inventor:
John F. Golding
By Jas A Cowles
his Attorney.

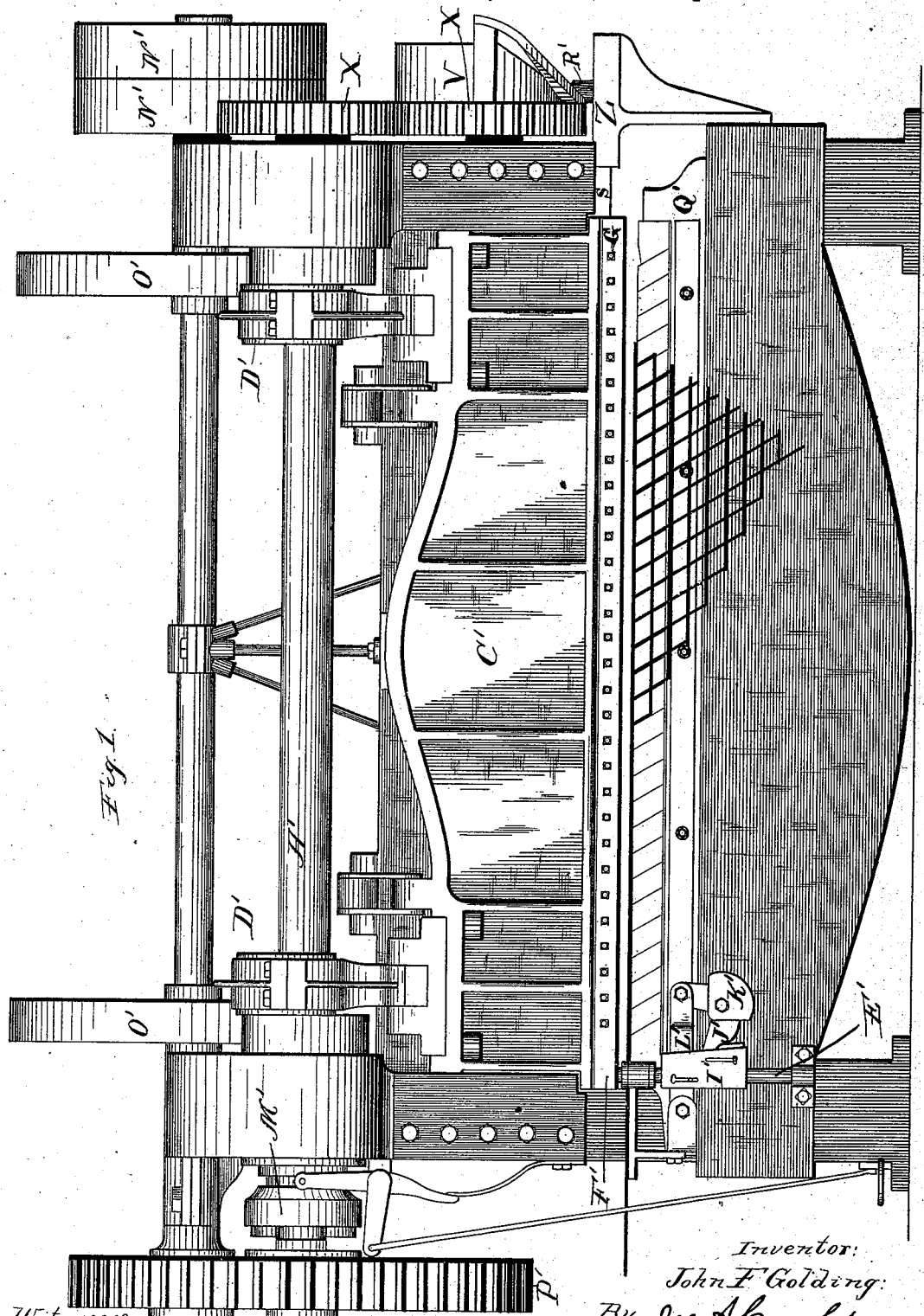

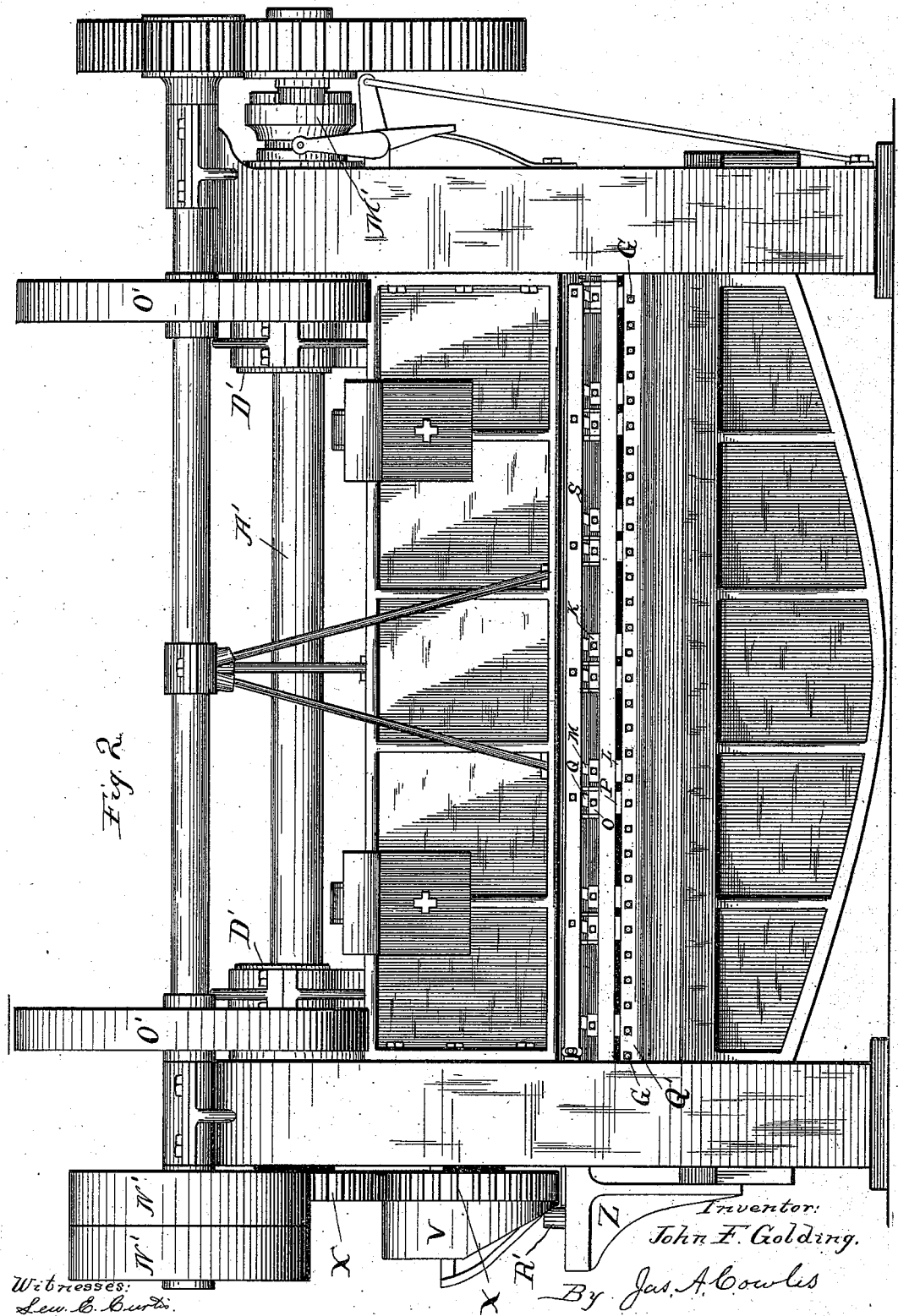

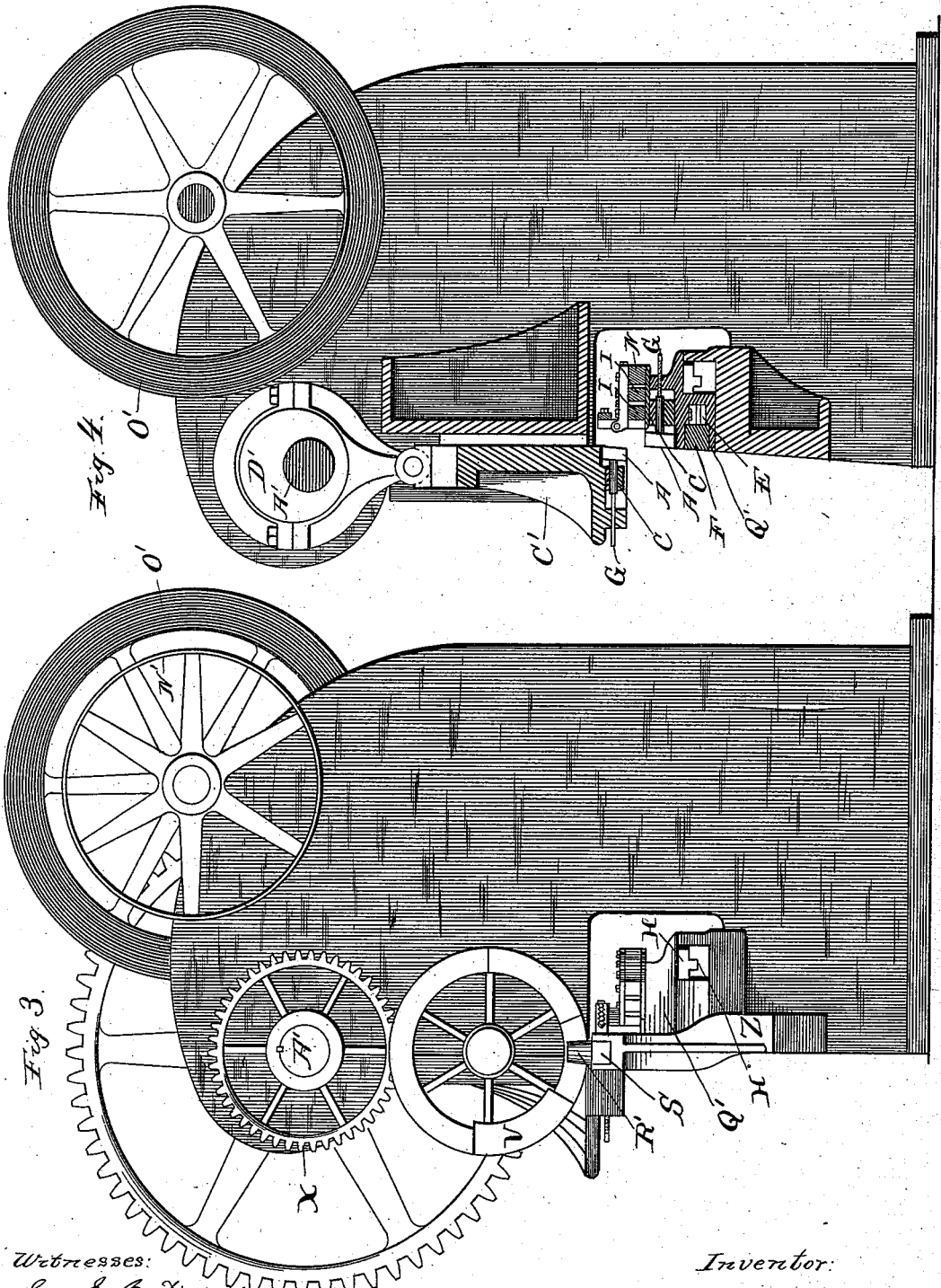

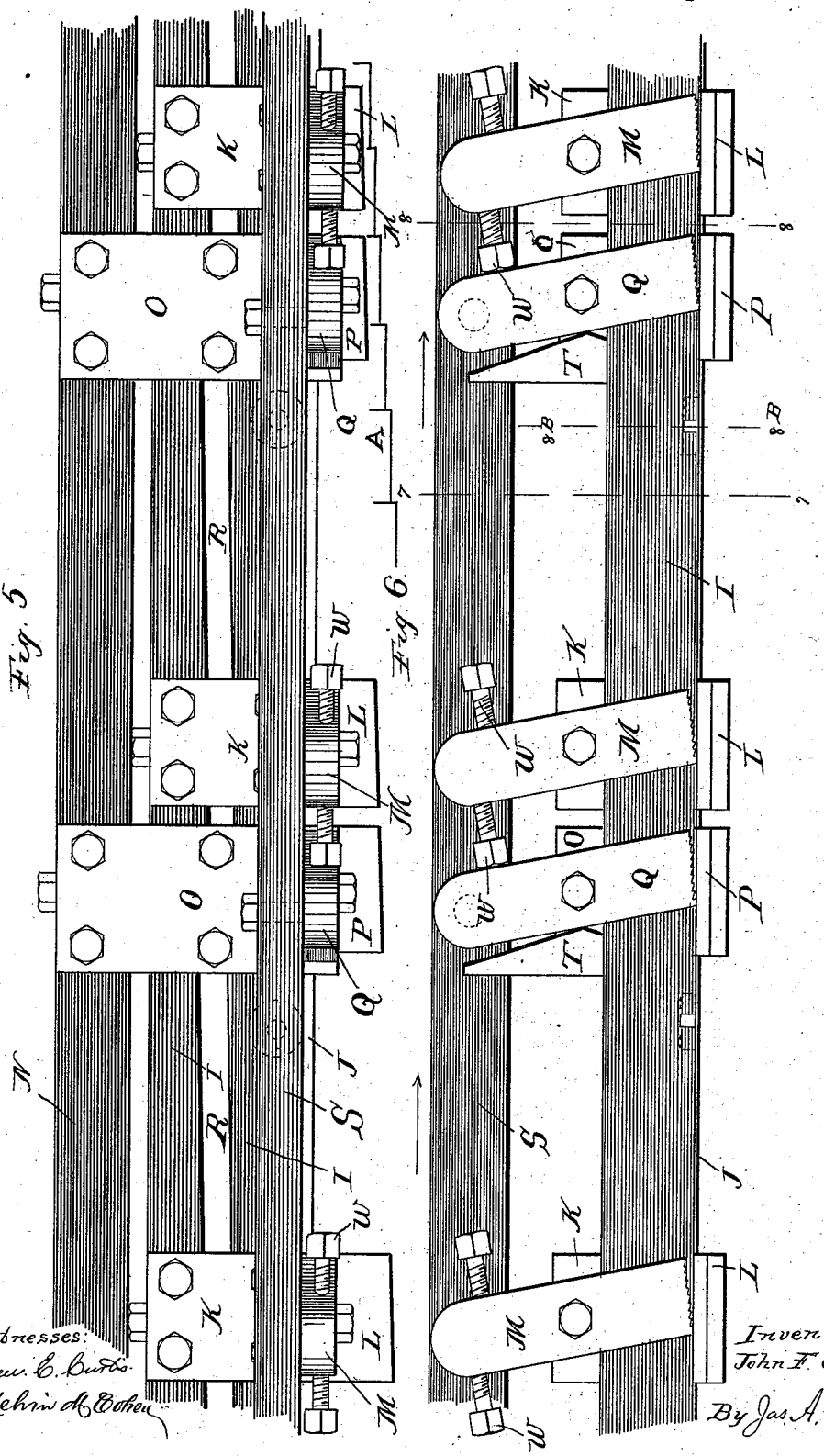

(No Model.) 7 Sheets—Sheet 6.
J. F. GOLDING.
MACHINE FOR MAKING SLASHED METALLIC SCREENING.
No. 381,231. Patented Apr. 17, 1888.
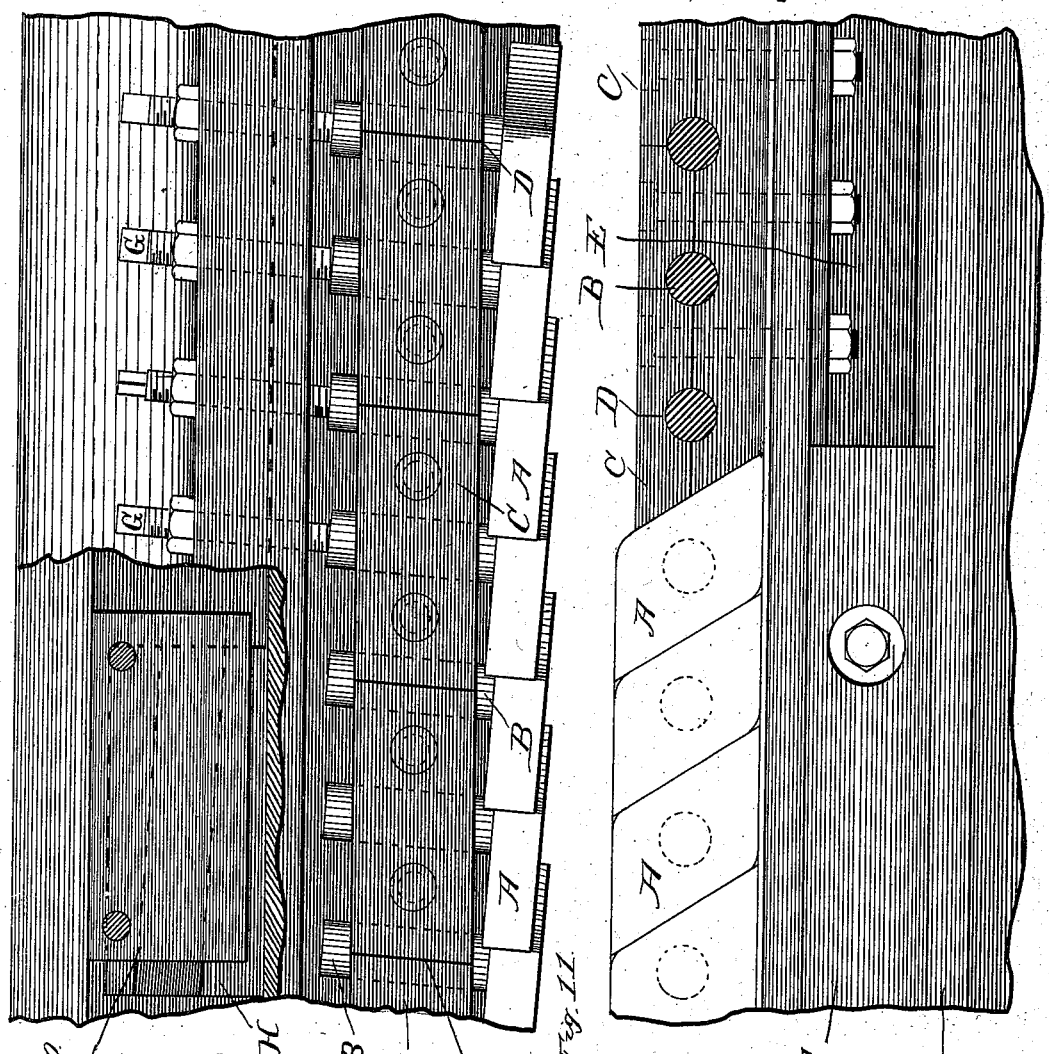
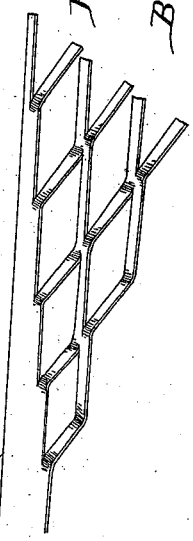
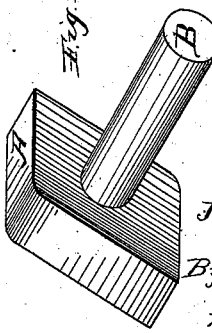
Witnesses:
Inventor:
John F. Golding
By Jas A Cowles
his Attorney (No Model.) 7 Sheets—Sheet 7.
J. F. GOLDING.
MACHINE FOR MAKING SLASHED METALLIC SCREENING.
No. 381,231. Patented Apr. 17, 1888.
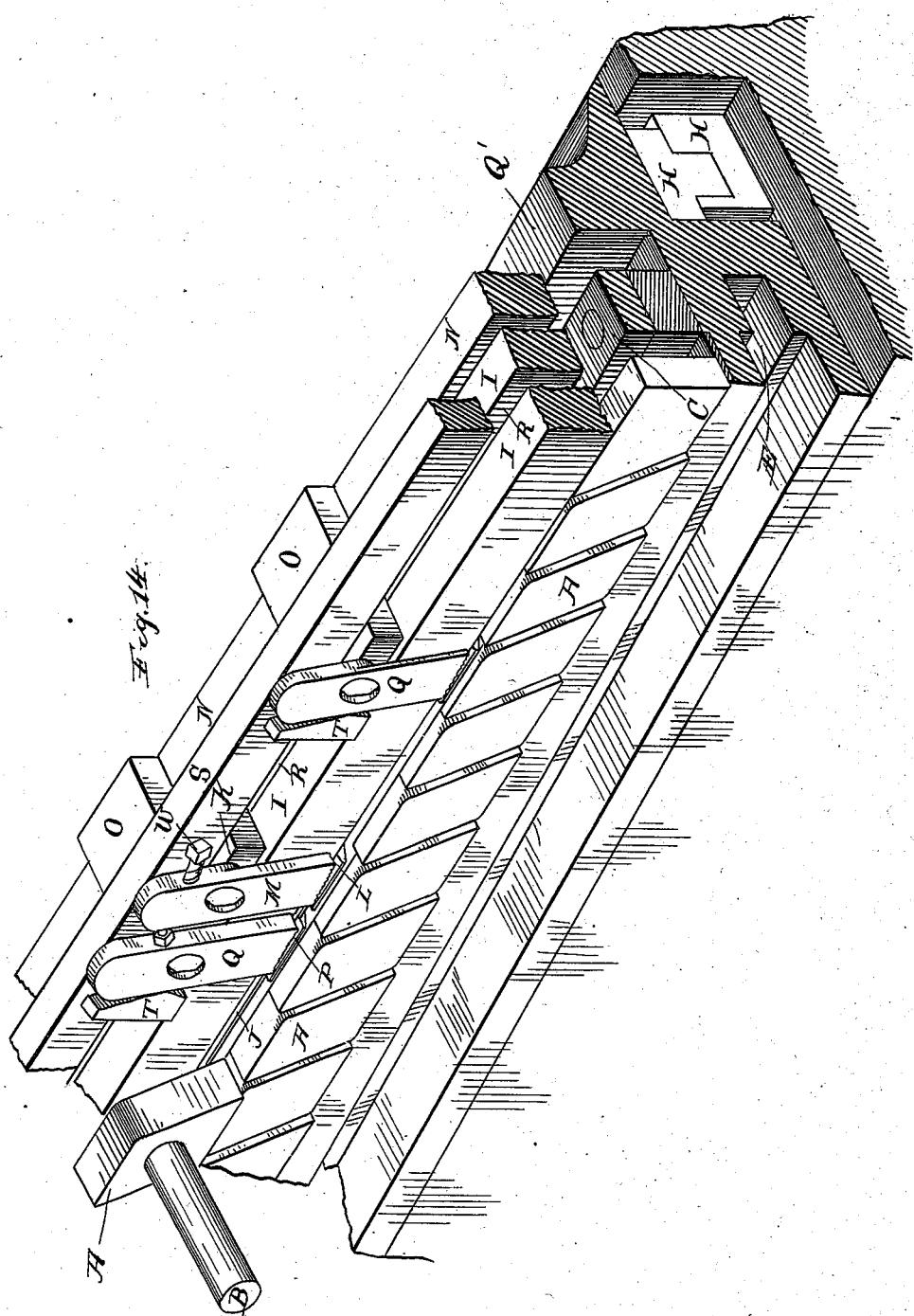
Witnesses:
Lew. E. Curtis.
Melvin M. Cohen.
Inventor:
John F. Golding.
By Jas. A. Cowles.
his Att'y

UNITED STATES PATENT OFFICE.

JOHN FRENCH GOLDING, OF CHICAGO, ILLINOIS, ASSIGNOR TO THE EXPANDED METAL COMPANY, OF MISSOURI.

MACHINE FOR MAKING SLASHED METALLIC SCREENING.

SPECIFICATION forming part of Letters Patent No. 381,231, dated April 17, 1888.

Application filed January 7, 1887. Serial No. 223,644. (No model.)

*To all whom it may concern:*

Be it known that I, JOHN FRENCH GOLDING, a citizen of the United States, residing in the city of Chicago, in the State of Illinois, have invented certain new and useful Improvements in Mechanism for Manufacturing Slashed Metallic Screening, of which the following is a specification.

The nature and object of this invention are to produce a machine for simultaneously cutting and expanding slashed metallic screening in a cheap and efficient manner.

Figure 1 is a front view of the machine, showing a piece of metal in the machine, part of which is cut and expanded. Fig. 2 is a rear view of the machine. Fig. 3 is an end view of the machine. Fig. 4 is a transverse sectional view of machine. Fig. 5 is a plan view of the device for feeding the metal into the machine, and in connection therewith a number of cutters are shown in their proper position. Fig. 6 is a front view of device shown in Fig. 5. Fig. 7 is a transverse sectional view of device shown in Fig. 5. Fig. 8 is a transverse sectional view showing the feeding device in connection with the longitudinal sliding head and lower cutters attached thereto. Fig. 8$^B$ is a detail showing frictional roller in guide-bar. Fig. 9 is a perspective view of a segment of the feeding device. Fig. 10 is a plan view of a segment of the longitudinal sliding head carrying lower cutters. Fig. 11 is a front view of segment of longitudinal sliding head, showing lower cutters in position and the means for securing them to said sliding head. Fig. 12 is a perspective view of one of the cutters. Fig. 13 is a perspective view of a piece of metal, part of which is formed into slashed metallic screening. Fig. 14 is a perspective view, looking from the delivery end of the machine, showing the lower sliding head, cutters, and feeding device.

Similar letters of reference refer to similar parts in the different figures.

The novel features of this invention relate to the feeding and cutting device.

A in Figs. 4, 5, 8, 10, 11, and 12 shows the form of the cutters.

B, Fig. 12, is a stock secured to or integral with each cutter.

C is a clamp for clamping the stock B of cutters A. This clamp is formed of an upper and lower jaw drawn together by suitable bolts. One jaw of this clamp is cut into segments for the purpose of easily removing the cutters, as shown at D, Figs. 8, 10, and 11. There are two of these clamps, each similarly constructed, one of which is secured in the upper part of the lower cutter-head and the other to the lower part of the upper cutter-head, as shown at C, Fig. 4.

E, Figs. 4, 8, 11, and 14, shows a recess in lower cutter-head, through which access is obtained to the nuts of the bolts employed for drawing the jaws of the clamp together. Said bolts also secure the clamp to the said longitudinally-traveling head.

F, Figs. 8 and 11, is a filling-piece placed in said recess E for the purpose of supporting the parts, and is held therein by suitable bolts.

G G in Figs. 1, 2, 4, 8, and 10 are adjusting-screws which pass through the upper part of the longitudinally-traveling head, as shown in Fig. 8, and the lower part of the vertically-traveling head, as shown in Fig. 4, and bear against the stocks B of the cutters for the purpose of adjusting the cutters. These cutters A A are placed edge to edge, their vertical faces being offset in step form, as shown in Figs. 10 and 11, and being of uniform size, each cutter can be adjusted at pleasure by the screws G.

I I, Figs. 4, 5, 6, 7, 8, 9, and 14, are two bars parallel with bar N and fastened to the machine, one of which bars, having the flange J, (see Figs. 8 and 9,) serves to guide the metal to be cut and expanded. To these two bars are secured caps K and shoes L by bolts passing through them, which hold them firmly in position. Caps K carry dogs M, Figs. 5, 6, and 13, which are used to lock the metal in position while it is being cut and expanded.

N, Figs. 5, 7, 8, 9, and 14, is a longitudinally-traveling bar located at rear of bars I I, and carrying caps O O and shoes P, Figs. 5, 6, 7, 8, and 9, said caps and shoes being secured respectively above and below said bar N by suitable bolts, one set of said bolts passing through the space K between bars I I. This bar N travels longitudinally with its dogs Q, Figs. 5, 6, and 14, and is given a lateral movement by the cap-bolts which pass through slot or space R, Figs. 5, 7, 8, and 9, these slots diverging from the face of the flanged bar I in the direction of the forward travel of the bar N.

S, Figs. 5, 7, 8, and 14, is a parallel bar, to which are connected at their upper ends the dogs Q.

T, Figs. 6, 7, 9, and 14, are stops against which the dogs Q strike in their backward movement.

U, Fig. 7, is a friction roll or slide to prevent wear upon the bolts, securing caps O and shoes P to bar N in their longitudinal travel.

Bars N and I are set down in the cut-away part of shoes L and P for the purpose of allowing flange J to extend outwardly from the guide-line, so that the end of the metal feeding over said shoes will be supported thereby in its forward travel.

V, Figs. 1, 2, and 3, is a rotary cam actuating the parallel bar S backward and forward, and is worked by gears X X, operated from the main shaft.

Figs. 6 and 4 show the parallel bar S in its forward position, with its feed-dogs Q thrown against screw W in dogs M, causing said dogs to lock the metal between them and their shoes L. It is while the dogs are all in this position that the cutters operate on the metal.

Z, Figs. 1, 2, and 3, is a bracket supporting and forming guide for end of parallel bar N below the rotary cam.

H H, Figs. 8, 10, and 14, are wedge-shaped pieces which govern the lower sliding head in its lateral movement, causing it to travel parallel with the face of the cutter.

A, Fig. 14, is an upper cutter, shown in its position relative to the lower cutters before the act of cutting begins.

The bar E', Fig. 1, is connected at its upper end with the upper vertically-moving cutter-head, C', at the point F'. The bar E' works in bearings at its lower end. On this bar E' is the boxing I'.

J' is a bent lever working on fulcrum K'. At one end it works in a rear boxing, I'. At the other end it is connected to link L'. The other end of this link is attached to and reciprocates the lower cutter-head. The adjusting-screws W, Figs. 5, 6, and 14, are attached to one set of dogs forming bumpers for locking one set.

M', Fig. 1, is a clutch operated by means of lever beneath it, and used for the purpose of throwing the machine in and out of gear.

N' N' are tight and loose pulleys on the counter-shaft of the machine. O' O' are fly-wheels on said counter-shaft.

The movements and purposes of this machine are accomplished as follows: Power is conveyed to the machine by a belt running on the tight pulley on the counter-shaft, on which are secured fly-wheels O' O' and a spur-gear, the latter meshing with the large gear P', which runs loosely on main shaft A'. The clutch M', when thrown into connection with the large gear, operates the shaft A', which, by means of eccentrics D' D', connected by straps and rods to cutter-head C', gives the latter the requisite vertical movement. At F' is connected the bar E', which by its upward and downward movement operates levers J' and link L', which latter being connected to the lower longitudinally-sliding head Q', gives to it its requisite movement. Gears X X, Fig. 3, rotate the cam V, which is secured to one of said gears, said cam giving a longitudinal back and forward movement to parallel bar S, which, being connected to the upper ends of feeding-dogs Q Q, (shown in Figs. 5, 6, 7, 8, and 14,) causes them to lock the metal to be cut between their lower serrated faces and their shoes P, and moves the dogs and the metal thus locked forward the requisite distance, and when about at the end of the forward travel said dogs are brought against the heads of the adjusting-screws in the other set of dogs, causing them also to firmly hold the metal between their lower serrated faces and their shoes, and to hold this interlocked position by means of a dwell on cam V, passing along roller R', said roller being secured to the bar S. When these dogs remain in this position, the act of simultaneously cutting and expanding the metal is performed, the cutters in the vertically-traveling head-piece passing through the metal, their beveled faces following the beveled faces of the cutters in the lower longitudinally-traveling head Q, which is moved by the bent lever and link connection J' and I'. When the cutters on the vertically-moving head have passed the lower cutters the requisite distance, the cam quickly returns the parallel bar S, causing bumper T (shown in Fig. 6) to strike against the head of the opposite screw, causing the locking-dogs M M to loose their hold on the metal. While this backward movement of bar S is being performed, the eccentrics D' D' being at or about the lowest point of their throw, the cutter-head C consequently has but little movement and the cutters hold the metal in position while the feeding-dogs are making their backward movement. The cut-away part of cam V permits the feeding device to lie dormant while the vertically-traveling head C' passes upward sufficiently far to clear a space between the cutters, when levers J' and link L' operate to return the lower cutter-head to its former position after cam V again has caused another forward feed movement of bar S. The dogs Q Q in their backward and forward movement are also given a side movement corresponding with slightly-angular facings of sides of parallel bars I I (indicated by R) and collar U, fitting therein between said bars, the object being to give a draw movement to the feeding-dogs, and thereby cause the metal to travel closely along the bar I and guide-line J, and to prevent the cutters from drawing the metal away from said line.

It will be observed that wedges H H, Figs. 8 and 10, are a device for imparting the side or lateral movement of lower cutter-head, the lower part of same being secured to lower bed of machine and the upper part to the sliding head, the purpose of this being to cause said cutters to travel backward and forward parallel with their faces. The inclination of the wedges H H is determined by the angle at which the lower cutters are set. The faces of the upper cutters are set to correspond with the faces of the lower cutters, and consequently fit into the lower cutters in their travel. The object in having a lateral travel to the lower head is that the cutters in the vertically-traveling head may be immediately beneath and in line with the main shaft of the machine.

The bars I I may be made in one piece and slotted to accomplish the same purpose.

I claim—

1. In a machine for manufacturing slashed metallic screening, the combination of two cutter-heads with cutters in each head being set edge to edge, and their faces being set at an angle with each line of said cutters in step form and adjustable backward and forward in the angle in which they are set.

2. A movable cutter having a center stock and four cutting sides, two of said cutting sides being parallel with each other and oblique to the other two cutting sides.

3. In a machine for manufacturing slashed metallic screening, the combination of fixed guide-bars provided with spaces or slots within, through, or between them, said spaces or slots diverging in a greater or less degree from the line of the guide in said bars in the direction of the feed, with suitable feeding mechanism.

4. In a machine for manufacturing slashed metallic screening, the combination therewith of an intermittent feeding device, consisting of an actuating-bar loosely attached to one end of one or more locking-dogs, said dogs being loosely secured at or near their centers to journals and clamping against jaws at their opposite ends, said journals and jaws being securely attached one above the other to a bar or bars connecting the requisite number of said journals and jaws, all of said parts being held in their respective positions by a guide-bar fixed to the main frame of the machine.

JOHN FRENCH GOLDING.

Witnesses:
W. A. DIRR,
MELVIN M. COHEN,